Nov. 15, 1966    B. E. LEVENTHAL ETAL    3,284,925
PROGRAMMED SELF-INSTRUCTION AND QUIZ APPARATUS
Filed June 24, 1964

| FRAME LETTERS | QUESTIONS | ANSWERS |
|---|---|---|
| Y | 1. Bob and Carol are teen-agers you would like to meet. You will enjoy reading about Bob and Carol. You will also improve your reading as you read about ___ and ___. | read |
| C | 2. Bob and Carol had one big problem in school. They did not read well. Their grades in almost every subject improved when they learned to ___ better. | See M / Same / See F. |
| P | 3. Follow this book carefully. When you finish you will be able to read better just as Bob and Carol. Do you think you will be able to earn better grades if you read better? (yes or no) | Same |
| Q | 4. At first Bob and Carol had difficulty in finding the meaning of what they were reading. They wanted to improve their reading. They wanted to ___ better so they could understand better. | a and c / See Y |

| FRAME LETTERS | QUESTIONS | ANSWERS |
|---|---|---|
| B | 5. Bob and Carol started to read better when they learned an important fact. Read the following two sentences carefully: 1. Bob played third base on his school team. 2. Bob was his school team's third baseman. These two sentences are different. But is the meaning of the sentences the same or different? ___ | Yes / See C |
| M | 6. The meaning of the sentences is the same. Now read these sentences: a. Carol is one of the cheer leaders at the ball game. b. One of the cheer leaders at the ball game is Carol. In these sentences the meaning of thought is also the ___. | Bob and Carol / See P |
| F | 7. Find the two sentences that have the same thought. a. Bob is one of the best players on the team. b. Bob is liked by all the players on the team. c. One of the best players on the team is Bob. The two sentences with the same thought are lettered ___ and ___. | read / See Q |

INVENTORS
BERNARD E. LEVENTHAL
LAWRENCE H. FEIGENBAUM

United States Patent Office 3,284,925
Patented Nov. 15, 1966

3,284,925
PROGRAMMED SELF-INSTRUCTION AND QUIZ APPARATUS
Bernard E. Leventhal and Lawrence H. Feigenbaum, New York, N.Y., assignors to Globe Book Company, Inc., a corporation of New York
Filed June 24, 1964, Ser. No. 377,559
6 Claims. (Cl. 35—9)

This invention relates to programmed self-instruction and self-testing apparatus.

It is an object of the present invention to provide a specially programmed device which contains a series of question frames and individual responses thereto, in which the responses are located in the immediate vicinity of the programmed question material but are especially coded so as to effectively delay access thereto until consciously sought by the student.

This programmed self-instruction apparatus is extremely simple in appearance and arrangement, readily adapted for all types of instruction, teaching, and testing purposes, and readily adaptable for use by students in all age groups.

Another object of the present invention is to provide quiz apparatus of the type described, which may be in the form of a book, pad, or individual test sheets, containing a plurality of individual frame sections each having identifying frame indicia, a question, an answer reference note to another frame section, and a corresponding answer to another frame section applying to said question of the frame section having the reference note referring to such other frame section, whereby the answers to all of the questions are readily accessible to the test subjects only upon a deliberate and conscious attempt to locate such answers.

All of the foregoing and still further objects and advantages of this invention will become apparent from a study of the following specification, taken in connection with the accompanying drawing, wherein:

The figure is a perspective view of programmed self-instruction apparatus made in accordance with the present invention.

Referring now to the drawing, programmed self-instruction apparatus made in accordance with the present invention is shown to be in the form of a book 10 having a plurality of sheets 12 forming facing pages 14, 15, each having a plurality of individual frame sections.

Vertical lines 16 on each page define three individual columns; one column having the heading "Frame Letters" 18, the center column having the heading "Questions" 20, and the third column having the heading "Answers" 22. Horizontal lines 24 separate adjacent frame sections for maximum clarity.

Each frame section includes a question portion 28 with blank spaces 30 which can be filled in with the correct responses either in the programmed text or on a blank sheet of paper in the event that the programmed text is to be reused by another student. Each frame section also includes identifying frame indicia 31 under the "frame letters" column 18, and answer reference note 32 to another frame section, and an answer 33 to another frame section, as will be hereinafter more fully described.

In actual use, a student starting with frame No. 1, would first read the material and then write the responses thought to be proper in the blank spaces 30, or upon a separate sheet of paper. In order to determine whether the response was correct, the student would refer to the reference note 32 directing him to frame section "M." Upon referring to frame section "M" designated by the reference numeral 34, the answer 36 in the "Answers" column 22 of the frame section reads "Bob and Carol" which would be the correct responses for frame No. 1.

Thus, by listing the identifying frame indicia in the "Frame Letters" column, in random order, the student cannot observe the correct answer to each question, except by a deliberate and conscious attempt. This relieves the student from having to consciously avoid observing the correct answers while working through each frame, while making the answers readily available in the immediate vicinity of the frames whenever such are deliberately sought.

The programmed self-instruction aparatus is especially useful when it is desired to check the answer to each frame as it is answered, thus obviating the necessity for turning pages, referring to other books or pamphlets or answer sheets.

Although the apparatus shown in the drawing is in the form of a bound book, it will be recognized that this invention is readily applicable to pads, individual sheets, folders, or the like.

While this invention has been described with particular reference to the construction shown in the drawing, it is to be understood that such is not to be construed as imparting limitations upon the invention, which is best defined by the claims appended hereto.

Having thus described our invention, we claim as new and desire to secure by Letters Patent:

1. A programmed self-instruction device comprising, in combination, a series of individual frame sections on a single page, each of said frame sections having an identifying frame section indicia, a question portion, an answer reference note to another frame section on said page and an answer to the question of another frame section on said page, said identifying frame section indicia of said frame sections being arranged at random, and the answer in one frame section on said page applying to the question in another frame section on said page having a reference note to said one frame section.

2. In a book having sheets of facing pages, a series of individual frames imprinted upon each pair of said facing pages each having identifying frame indicia, a question portion, and an answer reference note to another frame on said pair of facing pages, and an answer to a question of another frame on said page pair, said identifying frame indicia of said frames being arranged in random, and the answer in one frame on said page pair applying to the question in another frame on said page pair having a reference note to said one frame on said page pair.

3. In a book as set forth in claim 2, wherein each said frame comprises a rectangular area, said question being positioned centrally of said rectangular area, said identifying frame indicia being positioned to one side of said question, and said answer and said answer reference note being positioned in spaced apart relationship on the opposite side of said question.

4. In a book as set forth in claim 3, further comprising indicia on each said page separating each said frame and in each said frame separating said question from said identifying frame indicia and said answer and answer reference note.

5. Programmed self-instruction apparatus comprising, in combination, at least one page having a plurality of individual frame sections, each of said frame sections having identifying frame indicia, a question, an answer reference note to another frame section on said page, and an answer in another frame section on said page applying to said question, and said reference note in said frame section on said page referring to said other frame section.

6. Programmed self-instruction apparatus as set forth in claim 5, wherein said identifying frame indicia of said frame sections are arranged in random order.

References Cited by the Examiner

UNITED STATES PATENTS 3,103,073  9/1963  Nickl et al. _____ 35—9
3,123,920  3/1964  Crowder et al. _____ 35—9

OTHER REFERENCES

"Adventures in Algebra," by Crowder and Martin, published in 1960 by Doubleday and Co. Inc.

EUGENE R. CAPOZIO, *Primary Examiner.*

S. M. BENDER, *Examiner.*